(12) United States Patent
Therien et al.

(10) Patent No.: US 10,922,143 B2
(45) Date of Patent: *Feb. 16, 2021

(54) SYSTEMS, METHODS AND DEVICES FOR DETERMINING WORK PLACEMENT ON PROCESSOR CORES

(71) Applicant: Intel Corporation, Santa Clara, CA (US)

(72) Inventors: Guy M. Therien, Beaverton, OR (US); Michael D. Powell, Northborough, MA (US); Venkatesh Ramani, Milpitas, CA (US); Arijit Biswas, Holden, MA (US); Guy G. Sotomayor, Big Oak Valley, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/107,691

(22) Filed: Aug. 21, 2018

(65) Prior Publication Data

US 2018/0357110 A1    Dec. 13, 2018

Related U.S. Application Data

(63) Continuation of application No. 14/997,032, filed on Jan. 15, 2016, now Pat. No. 10,073,718.

(51) Int. Cl.
*G06F 1/00* (2006.01)
*G06F 9/50* (2006.01)
(Continued)

(52) U.S. Cl.
CPC ............ *G06F 9/5083* (2013.01); *G06F 1/324* (2013.01); *G06F 1/329* (2013.01); *G06F 1/3296* (2013.01);
(Continued)

(58) Field of Classification Search
CPC ........ G06F 1/324; G06F 1/329; G06F 1/3296; G06F 9/3009; G06F 9/5033; G06F 9/5044; G06F 9/5083; G06F 9/5094; Y02D 10/22
See application file for complete search history.

(56) References Cited

U.S. PATENT DOCUMENTS

| 4,228,496 A | 10/1980 | Katzman et al. |
| 4,356,550 A | 10/1982 | Katzman et al. |

(Continued)

FOREIGN PATENT DOCUMENTS

| CN | 101504618 A | 8/2009 |
| JP | 2010039923 A | 2/2010 |
| JP | 2014032621 A | 2/2014 |

OTHER PUBLICATIONS

International Search Report and Written Opinion dated Mar. 21, 2017 for International Application No. PCT/US2016/066351, 14 pages.

(Continued)

*Primary Examiner* — Zhipeng Wang
(74) *Attorney, Agent, or Firm* — Schwabe, Williamson & Wyatt, P.C.

(57) ABSTRACT

Apparatuses, methods and storage medium for computing including determination of work placement on processor cores are disclosed herein. In embodiments, an apparatus may include one or more processors, devices, and/or circuitry to identify a favored core of the processor cores. The one or more processors, devices, and/or circuitry may be configured to determine whether to migrate a thread to or from the favored core. In some embodiments, the determination may be by a process executed by a driver and/or by an algorithm executed by a power control unit of the processor.

20 Claims, 10 Drawing Sheets

(51) Int. Cl.
  *G06F 1/329* (2019.01)
  *G06F 1/324* (2019.01)
  *G06F 1/3296* (2019.01)
  *G06F 9/30* (2018.01)

(52) U.S. Cl.
  CPC .......... *G06F 9/3009* (2013.01); *G06F 9/5033* (2013.01); *G06F 9/5044* (2013.01); *G06F 9/5094* (2013.01); *Y02D 10/00* (2018.01)

(56) References Cited

U.S. PATENT DOCUMENTS

| | | |
|---|---|---|
| 4,958,273 A | 9/1990 | Anderson et al. |
| 5,367,697 A | 11/1994 | Barlow et al. |
| 5,491,788 A | 2/1996 | Cepulis et al. |
| 5,761,516 A | 6/1998 | Rostoker et al. |
| 6,141,762 A | 10/2000 | Nicol et al. |
| 6,407,575 B1 | 6/2002 | Wissell et al. |
| 6,425,068 B1 | 7/2002 | Vorbach et al. |
| 6,691,216 B2 | 2/2004 | Kelly et al. |
| 6,772,189 B1 | 8/2004 | Asselin |
| 6,826,656 B2 | 11/2004 | Augsburg et al. |
| 6,928,566 B2 | 8/2005 | Nunomura |
| 7,111,178 B2 | 9/2006 | Rusu et al. |
| 7,146,514 B2 | 12/2006 | Kaushik et al. |
| 7,268,570 B1 | 9/2007 | Audet et al. |
| 7,398,403 B2 | 7/2008 | Nishioka |
| 7,463,992 B2 | 12/2008 | Samaan et al. |
| 7,464,276 B2 | 12/2008 | Rusu et al. |
| 7,565,563 B2 | 7/2009 | Gappisch et al. |
| 7,596,708 B1 | 9/2009 | Halepete et al. |
| 7,702,933 B2 | 4/2010 | Tsai |
| 7,779,287 B2 | 8/2010 | Lim et al. |
| 7,814,252 B2 | 10/2010 | Hoshaku |
| 7,882,379 B2 | 2/2011 | Kanakogi |
| 7,895,453 B2 | 2/2011 | Kasahara et al. |
| 8,112,754 B2 | 2/2012 | Shikano |
| 8,281,164 B2 | 10/2012 | Kim |
| 8,296,773 B2 | 10/2012 | Bose et al. |
| 8,407,505 B2 | 3/2013 | Asaba |
| 8,417,974 B2 | 4/2013 | Heller, Jr. |
| 8,949,633 B2 | 2/2015 | Belmont et al. |
| 9,678,792 B2 | 6/2017 | Doyle et al. |
| 10,037,227 B2 | 7/2018 | Therien et al. |
| 2002/0099976 A1 | 7/2002 | Sanders et al. |
| 2002/0120882 A1 | 8/2002 | Sarangi et al. |
| 2002/0147932 A1 | 10/2002 | Brock et al. |
| 2002/0156611 A1 | 10/2002 | Lenormand |
| 2003/0033490 A1 | 2/2003 | Gappisch et al. |
| 2003/0076183 A1 | 4/2003 | Tam et al. |
| 2004/0015888 A1 | 1/2004 | Fujii et al. |
| 2004/0187126 A1 | 9/2004 | Yoshimura |
| 2005/0107967 A1 | 5/2005 | Patel et al. |
| 2005/0240735 A1 | 10/2005 | Shen et al. |
| 2006/0005056 A1 | 1/2006 | Nishioka |
| 2006/0107262 A1 | 5/2006 | Bodas et al. |
| 2007/0043964 A1 | 2/2007 | Lim et al. |
| 2007/0174829 A1 | 7/2007 | Brockmeyer et al. |
| 2007/0255929 A1 | 11/2007 | Kasahara et al. |
| 2007/0283128 A1 | 12/2007 | Hoshaku |
| 2008/0022052 A1 | 1/2008 | Sakugawa |
| 2008/0077815 A1 | 3/2008 | Kanakogi |
| 2008/0077928 A1 | 3/2008 | Matsuzaki et al. |
| 2008/0104425 A1 | 5/2008 | Gunther et al. |
| 2008/0196030 A1* | 8/2008 | Buros ................ G06F 9/5033 718/102 |
| 2008/0235364 A1 | 9/2008 | Gorbatov et al. |
| 2008/0301474 A1 | 12/2008 | Bussa et al. |
| 2009/0049312 A1 | 2/2009 | Min |
| 2009/0055826 A1 | 2/2009 | Bernstein et al. |
| 2009/0070772 A1 | 3/2009 | Shikano |
| 2009/0164399 A1 | 6/2009 | Bell, Jr. et al. |
| 2009/0165007 A1 | 6/2009 | Aghajanyan |
| 2009/0222654 A1 | 9/2009 | Hum et al. |
| 2009/0249094 A1 | 10/2009 | Marshall et al. |
| 2009/0288092 A1* | 11/2009 | Yamaoka ............. G06F 9/5033 718/104 |
| 2010/0053005 A1 | 3/2010 | Mukai et al. |
| 2010/0058086 A1 | 3/2010 | Lee |
| 2010/0077185 A1 | 3/2010 | Gopalan et al. |
| 2010/0094572 A1 | 4/2010 | Chase et al. |
| 2010/0095137 A1 | 4/2010 | Bieswanger et al. |
| 2010/0146310 A1 | 6/2010 | Kasahara et al. |
| 2010/0153954 A1 | 6/2010 | Morrow et al. |
| 2010/0153956 A1 | 6/2010 | Capps, Jr. et al. |
| 2010/0169609 A1 | 7/2010 | Finkelstein et al. |
| 2010/0303270 A1 | 12/2010 | Parkins |
| 2011/0004774 A1 | 1/2011 | Hansquine et al. |
| 2011/0023047 A1 | 1/2011 | Memik et al. |
| 2011/0087909 A1 | 4/2011 | Kanakogi |
| 2011/0088041 A1* | 4/2011 | Alameldeen ............ G06F 9/505 718/105 |
| 2011/0119508 A1 | 5/2011 | Heller, Jr. |
| 2011/0161965 A1 | 6/2011 | Im et al. |
| 2011/0173477 A1 | 7/2011 | Asaba |
| 2011/0252267 A1 | 10/2011 | Naveh et al. |
| 2012/0042176 A1 | 2/2012 | Kim |
| 2012/0079235 A1 | 3/2012 | Iyer et al. |
| 2012/0084777 A1 | 4/2012 | Jayamohan |
| 2012/0144217 A1 | 6/2012 | Sistla et al. |
| 2012/0144218 A1 | 6/2012 | Brey et al. |
| 2012/0146708 A1 | 6/2012 | Naffziger et al. |
| 2012/0166763 A1 | 6/2012 | Henry et al. |
| 2012/0185709 A1 | 7/2012 | Weissmann et al. |
| 2012/0284729 A1 | 11/2012 | Sharda et al. |
| 2012/0324250 A1 | 12/2012 | Chakraborty et al. |
| 2013/0007413 A1 | 1/2013 | Thomson et al. |
| 2013/0041977 A1 | 2/2013 | Wakamiya |
| 2013/0047166 A1 | 2/2013 | Penzes et al. |
| 2013/0080795 A1 | 3/2013 | Sistla et al. |
| 2013/0111226 A1 | 5/2013 | Ananthakrishnan et al. |
| 2013/0247046 A1 | 9/2013 | Asai et al. |
| 2014/0007097 A1 | 1/2014 | Chin et al. |
| 2014/0013330 A1* | 1/2014 | Wang ................. G06F 9/524 718/103 |
| 2014/0024145 A1 | 1/2014 | Bickford et al. |
| 2014/0026146 A1 | 1/2014 | Jahagirdar et al. |
| 2014/0068622 A1 | 3/2014 | Gmuender et al. |
| 2014/0089936 A1 | 3/2014 | Chang et al. |
| 2014/0130058 A1 | 5/2014 | Hum et al. |
| 2014/0181830 A1 | 6/2014 | Naik et al. |
| 2014/0189704 A1 | 7/2014 | Narvaez et al. |
| 2014/0237274 A1 | 8/2014 | Murakami |
| 2014/0281610 A1* | 9/2014 | Biswas ................ G06F 1/324 713/322 |
| 2014/0325511 A1 | 10/2014 | Aasheim |
| 2014/0344550 A1 | 11/2014 | Kruglick |
| 2014/0373025 A1* | 12/2014 | Kim ................. G06F 9/505 718/104 |
| 2015/0007187 A1* | 1/2015 | Shows ................ G06F 9/5088 718/104 |
| 2015/0205642 A1 | 1/2015 | Xu et al. |
| 2015/0046685 A1 | 2/2015 | Park et al. |
| 2015/0178138 A1* | 6/2015 | Saha ................. G06F 1/3203 718/104 |
| 2015/0286262 A1* | 10/2015 | Park ................. G06F 1/3206 713/320 |
| 2015/0355700 A1 | 12/2015 | Pusukuri et al. |
| 2016/0139964 A1* | 5/2016 | Chen ................. G06F 1/3206 718/104 |
| 2016/0246647 A1* | 8/2016 | Harris ................ G06F 9/5027 |
| 2016/0357676 A1 | 12/2016 | Cain, III et al. |
| 2017/0046198 A1* | 2/2017 | Solihin ................ G06F 9/505 |
| 2017/0090988 A1* | 3/2017 | Young ................. G06F 9/5038 |
| 2017/0177415 A1 | 6/2017 | Dhanraj et al. |

OTHER PUBLICATIONS

International Search Report and Written Opinion dated Feb. 17, 2017 for International Application No. PCT/US2016/062327, 13 pages.

(56) References Cited

OTHER PUBLICATIONS

Non-Final Office Action dated Mar. 16, 2015 for U.S. Appl. No. 13/830,157, 24 pages.
Non-Final Office Action dated Oct. 8, 2015 for U.S. Appl. No. 13/830,157, 27 pages.
Final Office Action dated Feb. 16, 2016 for U.S. Appl. No. 13/830,157, 20 pages.
Notice of Allowance dated May 25, 2016 for U.S. Appl. No. 13/830,157, 9 pages.
Notice of Allowance dated Jun. 14, 2016 for U.S. Appl. No. 13/830,157, 4 pages.
Non-Final Office Action dated Nov. 1, 2017 for U.S. Appl. No. 14/978,182, 21 pages.
Office Action dated Dec. 19, 2017 for Japanese Patent Application No. 2016-235553, 9 pages.
Final Office Action dated Mar. 8, 2018 for U.S. Appl. No. 14/978,182, 17 pages.
Tomoyo Hozono et al., "A Task Allocation Strategy for Heterogeneous Server Systems with a Machine Learning Approach," IPSJ SIG Technical Report, vol. 2011, No. 12, Mar. 11, 2011, 9 pages.
Non-Final Office Action dated Nov. 1, 2018 for U.S. Appl. No. 14/978,182, 24 pages.
Office Action dated Sep. 6, 2019 for Singapore Patent Application No. 10201610420T, 10 pages.
Office Action dated Aug. 14, 2019 for European Patent Application No. 16885414.9, 14 pages.
Office Action dated Feb. 3, 2020 for Chinese Patent Application No. 201611028185.2, 54 pages.

\* cited by examiner

401
```
now = current timestamp

Entrydelay = time (s) to wait after O/S puts work on a core to initiate any migration
Exitdelay = time (s) to wait after a migration before considering another migration,
regardless of schedule change
Loop delay = time (s) to wait between polls for new schedule
```

402
```
While (1) {

// we can avoid this penalty if we can be called when a change happens, e.g. for o/s
driven
  // but a hardware solution will need a polling interval
  if (! Change_in_running_cores) {
     sleep (loop delay);
     continue
  }
```

403
```
// two stacks, each of the size of the number of cores currently running
// note: fast stack size will vary depending on how many cores actually running; it's not
necessarily list of all cores
r = # of running cores that have something scheduled on them *now*
faststack = stack of the fastest r cores, *fastest* at top of stack
```

404
```
If (HWP) {
   slowstack = stack of *actually running* cores, core/thread sorted highest (top) to
lowest (bottom) requested perf
   continue if members of faststack are same as slowstack and *in the same order*
}
```

405
```
} else { // No HWP
   slowstack = stack of *actually running* cores, *slowest* at top of stack
   continue if members of faststack are the same as members of slowstack // because
already running on fastest r cores
}
```

406
```
// pop cores from fast stack, and if they're not running and timeouts are met, migrate
work from the slow stack
  while (!faststack.empty) {
     core = faststack.pop
     continue if (!HWP and core.running) // never migrate onto running core if no HWP
     continue if core.last_migration_time + exitdelay > now
```

FIG. 4A

407
```
done = FALSE;
while (!done and !slowstack.empty) {
  victim = slowstack.pop
  continue if (victim.last_migration_time + exitdelay > now )
  continue if (victim.last_schedule_time + entrydelay > now)

if (HWP) {
     // don't migrate if we would get more perf than requested for this workload
     continue if (core.perflevel > victim.requested_perflevel);

// don't migrate if target core is currently running and migration to victim
     // core would put it's perf level  under requirement specified by HWP
     continue if (core.running and victim.perflevel < core.requested_perflevel);
```

408
```
     // don't migrate if migration would exceed EPP change rate requested by
HWP -- compare slope to allowed rate
     continue if ((core.perflevel - victim.perflevel) / (now -
victim.last_migration_time) > core.epp_rate))

// don't migrate if core productivity below a threshold implying
     // migration worthwhile
     // current activity window can be o/s set or hw determined
     productivity = victim's delta-pcnt / delta-pcnt over current activity window
     continue if  (productivity  < productivity_threshold)

}
```

409
```
   // this constraint is redundant under most conditions but avoids
   // pathological migration onto a worse core
   continue if (victim.perflevel > core.perflevel)

// note that in HWP case if target core was running, this migration implies
   // swapping work between cores instead of merely  migrating to an idle core
   migrate victim to core at time now done = TRUE;
  }
}
```

FIG. 4B

SYSTEMS, METHODS AND DEVICES FOR DETERMINING WORK PLACEMENT ON PROCESSOR CORES

CROSS REFERENCE TO RELATED APPLICATION

This application is a continuation of U.S. patent application Ser. No. 14/997,032, entitled "SYSTEMS, METHODS AND DEVICES FOR DETERMINING WORK PLACEMENT ON PROCESSOR CORES," filed on Jan. 15, 2016, and claims priority to the Ser. No. 14/997,032 application. The entire disclosure of the Ser. No. 14/997,032 application is incorporated herein by reference.

TECHNICAL FIELD

The present disclosure relates to processor efficiency and more specifically relates to determining work placement on processor cores.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In order to manage manufacturing variation during fabrication of multicore processors while maintaining quality and reliability, conservative guard bands are employed during testing and devices are "binned" or classified based on their speed and power characteristics. Conventional speed binning treats multicore processors as single-core devices by assigning a single related speed and minimum operating voltage for the processor as a whole. The rated speed and minimum voltage typically reflects the speed of the slowest core and the minimum voltage of the core having the poorest minimum voltage.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIGS. 4A-B illustrate an example of pseudo code to implement a module of the Power Control Unit (PCU) of the system of FIG. 1, according to various embodiments.

DETAILED DESCRIPTION

Figure 1:
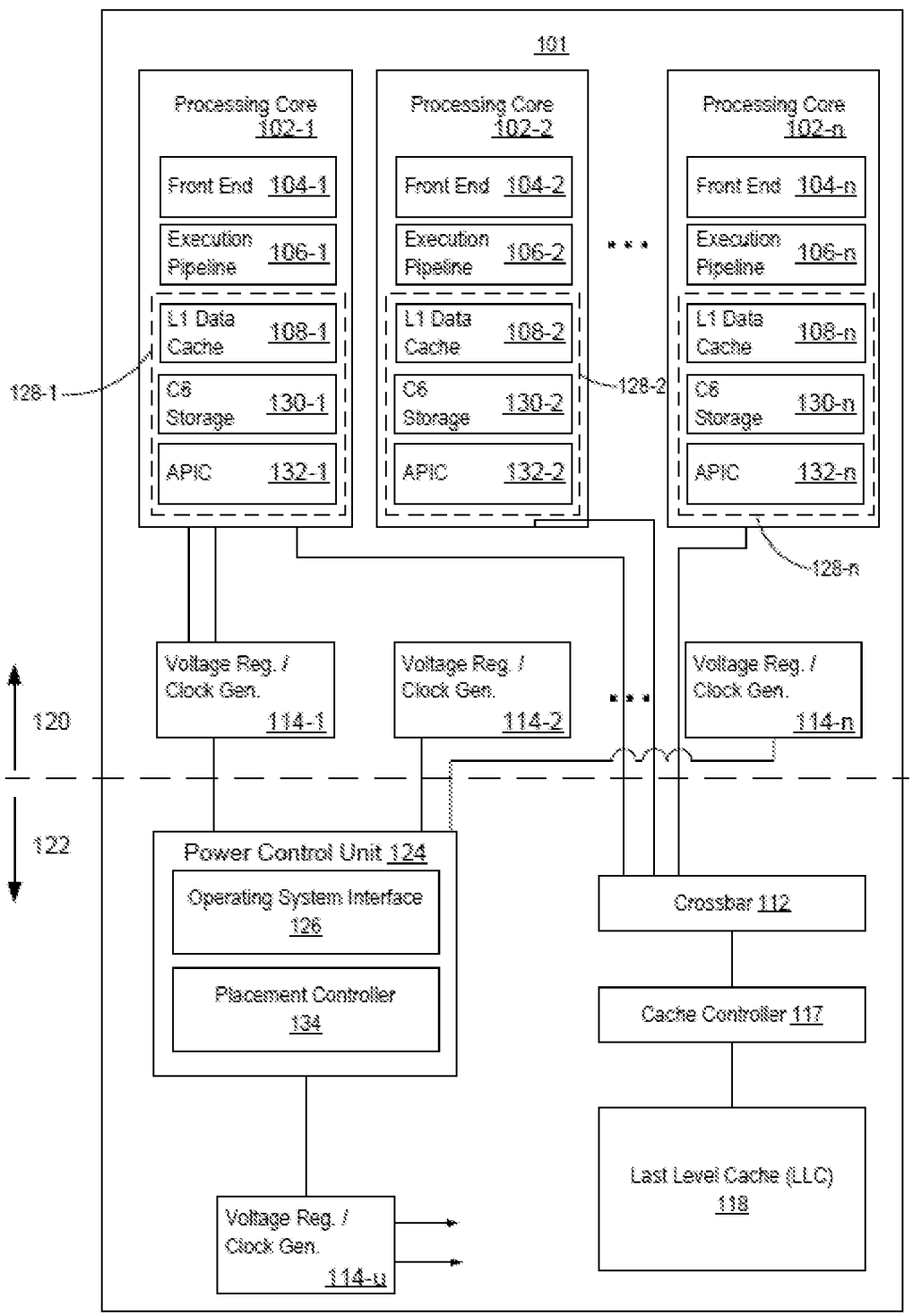
FIG. 1 illustrates an example system equipped with technology to determine work placement on processor cores, according to various embodiments.

Apparatuses, methods and storage medium associated with computing that includes determination of work placement on processor cores are disclosed herein. In embodiments, an apparatus may include one or more processors, devices, and/or circuitry to identify a favored core of the processor cores. The one or more processors, devices, and/or circuitry may be configured to determine whether to migrate a thread to or from the favored core. In some embodiments, the determination may be by executed process performed by a driver and/or by a process executed by a power control unit of the processor.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Processor cores (hereinafter, may also simply be referred to as cores) may be exposed to operating systems, typically via a firmware interface (e.g., Advanced Configuration and Power Interface (ACPI)). The operating system may create a list of logical processors and places work on these logical processor, with one or more logical processors associated with each processor core, in accordance with the operating system's scheduler policy. As such, the operating system may decide the physical placement of software threads (hereinafter "threads") within a processor package, e.g., on which core/logical processor the thread runs. For a variety of reasons, such as manufacturing variations, all cores are not created equal, e.g., while the cores may be logically identically (e.g., architecturally identical), but may have different physical characteristics. Cores that can operate at a higher performance level, e.g., higher frequency or lower voltage than the frequency/voltage band of the processor package may be referred to as favored cores. As such, placing work on a core without consideration of manufacturing variations and/or favored cores can result in higher power and/or lower performance.

This disclosure addresses a control process for placement of work on favored cores at the operating system at the software level (e.g., driver level), as well as the control process for placement of work on favored cores at a different level, e.g., a hardware (pcode) level.

An example process for placing work on a favored core may be implemented in operating system software (e.g., driver). The number of demanding threads, e.g., software threads, may be calculated (by virtue of per thread utilization exceeding a programmable threshold), and assigned to run on an ordered list of favored cores (for example using forced affinity). Further, dynamic adjustment may be made of workload assigned to the cores as conditions change. Threads of an application may be prioritized according to a list order provided or by virtue of the application being "in focus" (configurable).

Another example process for placing work on a favored core may include a pcode process for placing work on favored cores via Dynamic Core Migration (DCM) by examining core utilization, e.g., in terms of its c-state and p-state residency.

Utilizing favored cores first when a scheduler practices scheduling on no more cores than demand necessitates— may provide a performance and/or power benefit as the favored core may be both the highest performance core as well as the lowest voltage core.

FIG. 1 illustrates an example system equipped with technology to determine work placement on processor cores, according to various embodiments.

In at least one embodiment, system 100 may include a processor 101 having a core region 120 and an uncore 122. In some embodiments, the core region 120 may include multiple processing cores 102-1 to 102-$n$, but disclosed functionality may be applicable to single core processors in a multi-processor system. In some embodiments, the processor 101 may include a first processing core 102-1, a second processing core 102-2, and so forth through an n-th processing core 102-$n$.

In some embodiments, the processing cores 102 may include sub-elements or clusters that provide different aspects of overall functionality. In some embodiments, the processing cores 102 may include a front end 104, an execution pipeline 106, and a core periphery 128. The core periphery 128 may include a first level (L1) data cache 108, a storage, e.g., C-6 storage 130 (e.g., corresponding to ACPI state C-6), and an advanced programmable interrupt controller (APIC) 132. In at least one embodiment, the front end 104 may be operable to fetch instructions from an instruction cache (not depicted) and schedule the fetched instructions for execution. In some embodiments, the execution pipeline 106 may decode and perform various mathematical, logical, memory access and flow control instructions in conjunction with a register file (not depicted) and the L1 data cache 108. Thus, in some embodiments, the front end 104 may be responsible for ensuring that a steady stream of instructions is fed to the execution pipeline 106 while the execution pipeline 106 may be responsible for executing instructions and processing the results. In some embodiments, the execution pipeline 106 may include two or more arithmetic pipelines in parallel, two or more memory access or load/store pipelines in parallel, and two or more flow control or branch pipelines. In at least one embodiment, the execution pipelines 106 may further include one or more floating point pipelines. In some embodiments, the execution pipelines 106 may include register and logical resources for executing instructions out of order, executing instructions speculatively, or both. In embodiments, each core 102-1 through 102-$n$ may be a superscalar core or a hyperthreaded core. A superscalar core can execute two or more instructions in parallel. A hyperthread core can execute two or more instruction contexts or instruction streams in parallel.

The core periphery 128 can include logic that supports the front end 104 and the execution pipeline 106, including managing storage and interrupts. The core periphery 128 can include the L1 data cache 108, the C6 storage 130 and the advanced programmable interrupt controller (APIC) 132. The C6 storage 130 can store a software context and identity (or core state) of the processing core 102 when the processing core 102 transitions into a low-power state (such as a C6 state). A peripheral controller (e.g., the APIC 132) can manage interrupts for the processing core 102, including identifying which interrupts apply to the associated processing core 102 and managing an APIC ID which can be used to identify an associated core.

In at least one embodiment, during execution of memory access instructions, the execution pipeline 106 may attempt to execute the instructions by accessing a copy of the applicable memory address residing in the lowest-level cache memory of a cache memory subsystem that may include two or more cache memories arranged in a hierarchical configuration. In at least one embodiment, a cache memory subsystem may include the L1 data caches 108 and a last level cache (LLC) 118 in the uncore 122. In at least one embodiment, other elements of the cache memory subsystem may include a per-core instruction cache (not depicted) that operates in conjunction with the front end 104 and one or more per-core intermediate caches (not depicted). In at least one embodiment, the cache memory subsystem for the processor 101 may include L1 data and instruction caches per core, an intermediate or L2 cache memory per core that includes both instructions and data. The LLC 118, which includes instructions and data and may be shared among multiple processing cores 102. In some embodiments, if a memory access instruction misses in the L1 data cache 108, execution of the applicable program or thread may stall or slow while the cache memory subsystem accesses the various cache memories until a copy of the applicable memory address is found.

In at least one embodiment, the processor 101, the first processing core 102-1, the second processing core 102-2 and the processing core 102-$n$ may communicate via a crossbar 112, which may support data queuing, point-to-point protocols and multicore interfacing. Other embodiments of the processor 101 may employ a shared bus interconnect or direct core-to-core interconnections and protocols. In at least one embodiment, the crossbar 112 may serve as an uncore controller that interconnects the processing cores 102 with the LLC 118. In some embodiments, the uncore 122 may include a cache controller 117 configured to implement a cache coherency policy and, in conjunction with a memory controller (not depicted), maintain coherency between a system memory (not depicted) and the various cache memories.

In at least one embodiment, system 100 may also include a module 99, e.g., a favored core module, to determine work placement on the processor cores 102. In an example, the cores 102 may be a plurality of logically identical cores, e.g. architecturally identical cores. A first core of the plurality of cores may have a first physical characteristic and a second core of the plurality of cores may have a second physical characteristic that is different than the first physical characteristic. The module 99 may be configured to identify one of the first and second cores as favored with respect to the other of the first and second cores, e.g., by virtue of their differences in physical characteristics, such as their operating frequencies and/or voltages. The module 99 may be configured to ascertain whether to migrate a thread to or from the identified core. In an example, the module 99 may be configured to control a migration of the thread to or from the identified core, e.g., to output a signal to the placement controller 124, for instance.

Figure 2:
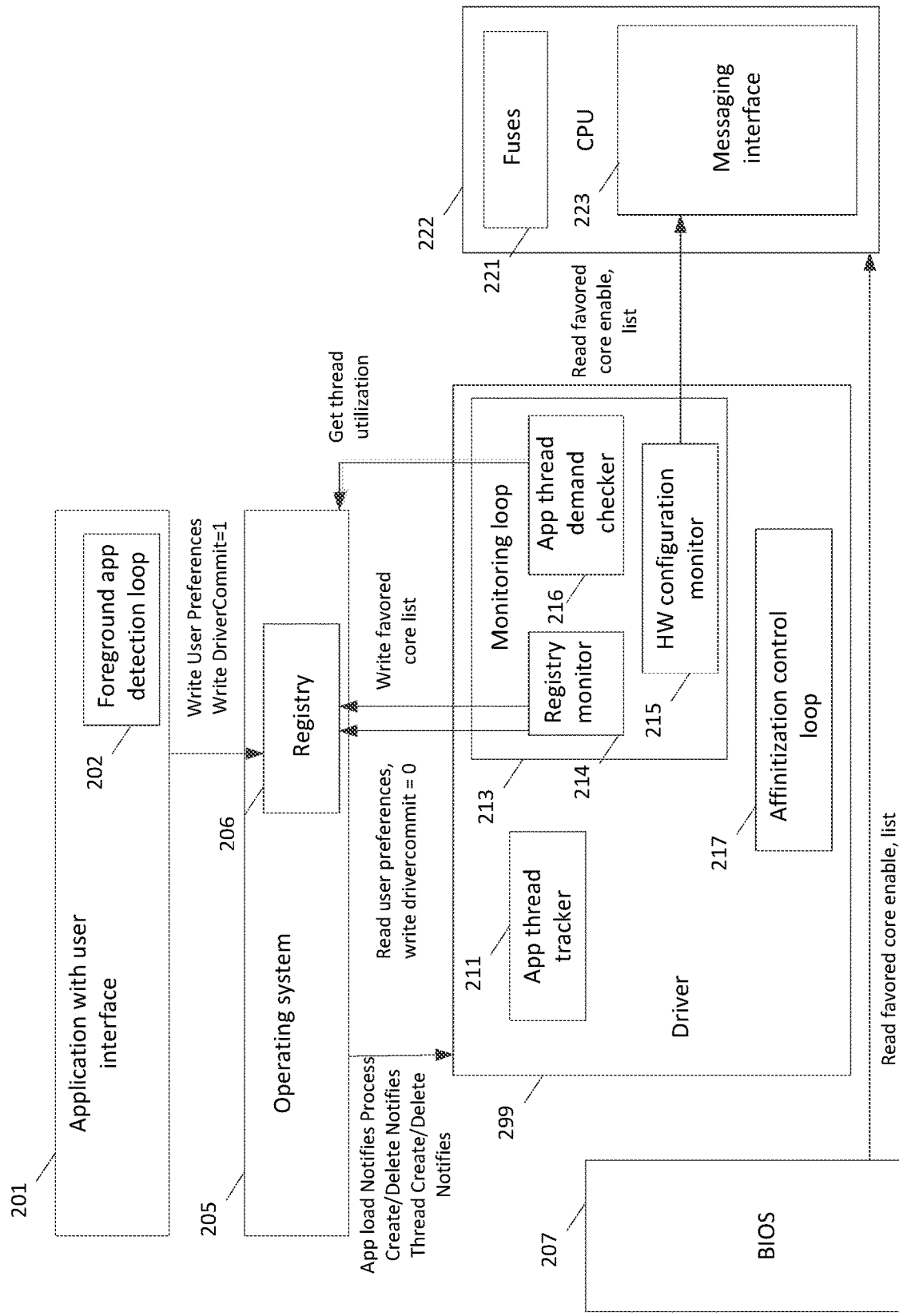
FIG. 2 illustrates an example of the system of FIG. 1 including a driver to determine work placement on processor cores, according to various embodiments.

In some embodiments, the module 99 may be a component of the power control unit (PCU) 124, e.g., a component of the placement controller 134 of PCU 124. However, in other embodiments, module 99 may be a component separate from components of PCU 124 and/or placement controller 134. For example, in some embodiments, module 99 may be a driver associated with an operating system (FIG. 2 illustrates an embodiment including a driver 299). In such a case, an output of module 99, e.g., a determination of work placement, may be input into a scheduler of the operating system, such as the operating system of a computing device of the system 100.

A power control unit may be a microcontroller or programmable state machine that consumes power related telemetry (sometimes continuously) from components on the CPU in order to manage power, frequency and temperature of the components. The system 100, e.g., the placement controller 134 and/or the component 99, can monitor workloads of the processing cores 102 and determine which work can be moved to a different core to increase efficiency. Efficiency can be measured in thermal output, power use and/or work accomplished. For example, efficiency can be increased by moving threads between cores that differ due to in-die variation (lower thermal output, decreased power usage, lifetime use management or more work performed). Efficiency can be increased by maintaining a low-voltage operation of a core by not providing a workload above a threshold (i.e., moving threads between cores to prevent a core from operating above a threshold, which is also known as "stressing" a core). Efficiency can be increased by combining multiple threads upon a single hyperthreading core, which saves power of a multi-core overhead. Efficiency can be increased by placing threads on cores that are physically separated to enable a larger spread of heat on the processor die. Efficiency can be increased by spreading heat by moving threads from physical processor to physical processor in sequence to heat different parts of a processor die. Efficiency can be increased by using cores with failed arithmetic units when instructions will not use the arithmetic units, and/or migrating threads between cores when the instructions will use the failed arithmetic units. Efficiency can be increased by performing load balancing for lifetime use management and/or thermal management.

In some embodiments, as a core is used and/or used to perform a large workload, the efficiency of the core may decrease. The efficiency decrease can be due to a larger operating voltage and/or a larger thermal output. In some embodiments, a lifetime use of cores can be managed, and workloads transitioned between cores to spread the lifetime usage of cores. In one embodiment, the processor can report a lower core count than actually available on the processor. The workload can be spread among cores to increase the overall lifetime and efficiency of the cores beyond what would be possible without the extra unreported cores. In some embodiments, threads can be transitioned off of a core to sequester the core. The sequestered core can be tested and/or determine performance characteristics of the core. In one embodiment, core sequestering can be used in conjunction with virtual machine manager solutions. In other embodiments, a sequestered core can be used to support other dedicated-purpose, hidden execution arrangements.

In some embodiments, the hardware PCU 124 can decide thread placement among the core and pipeline resources available. Logical processors of the cores can be enumerated to the OS. However, the number of logical processors can be less than a number of physical cores and/or simultaneous threads supported by the processor (i.e., there can be more processor resources than are enumerated to the OS). The OS may place work on the logical processors visible to it, and the processor (e.g., the PCU 124) may at a later time migrate a thread to a different resource. For example, the PCU 124 can initiate a sequence that saves the core's context, restores the context to a different core, and redirects a local APIC ID of the previous core to the new core. This migration can occur at the core or thread level. Alternatively, the hardware can provide migration hints to the OS through an operating system interface 126, and the OS can move the work from one core or thread to another.

In at least one embodiment, the core region 120 may include, in addition to the processing cores 102, voltage regulator/clock generator (VRCG) circuits 114 for each core processor 102. In some embodiments, in conjunction with per-core supply voltage signals and clock frequency signals generated by the PCU 124 and provided to each processing core 102, the VRCG circuits 114 support per-core power states by applying a power state indicated by the applicable supply voltage signal and clock frequency signal to the applicable processing core 102, as well as to the uncore 122.

In some embodiments, the PCU 124 is further operable to select processing cores 102 for execution of specific threads and to migrate a thread and its corresponding performance objective or context information from a first core (e.g., the first processing core 102-1) to a second core (e.g., the second processing core 102-2), when the performance characteristics of the second processing core 102-2 make the second processing core 102-2 better suited to achieve a desired efficiency objective than the first processing core 102-1. See, e.g., FIGS. 2 and 3 for a more detailed description of migration.

In some embodiments, the processor 101 may include a hybrid assortment of cores including, in addition to the processing cores 102, graphics cores and other types of core logic. In these hybrid core embodiments, the PCU 124 may determine an optimal or desirable power state, not only for the processing cores 102, but also for these other types of core elements in the core region 120. Similarly, in at least one embodiment, the processor 101 may include a VRCG circuit 114-u that provides the power state for the uncore 122 and, in this embodiment, the PCU 124 may determine the optimal or preferred power states for the uncore 122. In some embodiments, the processor 101 may support individualized power states for each processing core 102, any other types of cores in the core region 120, and the uncore 122. Other embodiments may support one power state for the entire core region 120 and one power state for the uncore 122.

The PCU 124 may be also include the operating system interface 126. In some embodiments, the PCU 124 can provide recommendations for work placement or migration to an operating system through the operating system interface 126. The operating system can then perform the thread migration between cores. For example, an operating system may not have enough information to recognize that two logical processors are actually associated with one hyper-thread core. The PCU 124 can recommend to the operating system that two threads be consolidated on the two logical processors, which can eliminate multi-core overhead.

FIG. 2 illustrates an example of the system of FIG. 1 including a driver to determine work placement on processor cores, according to various embodiments.

Figure 3A:
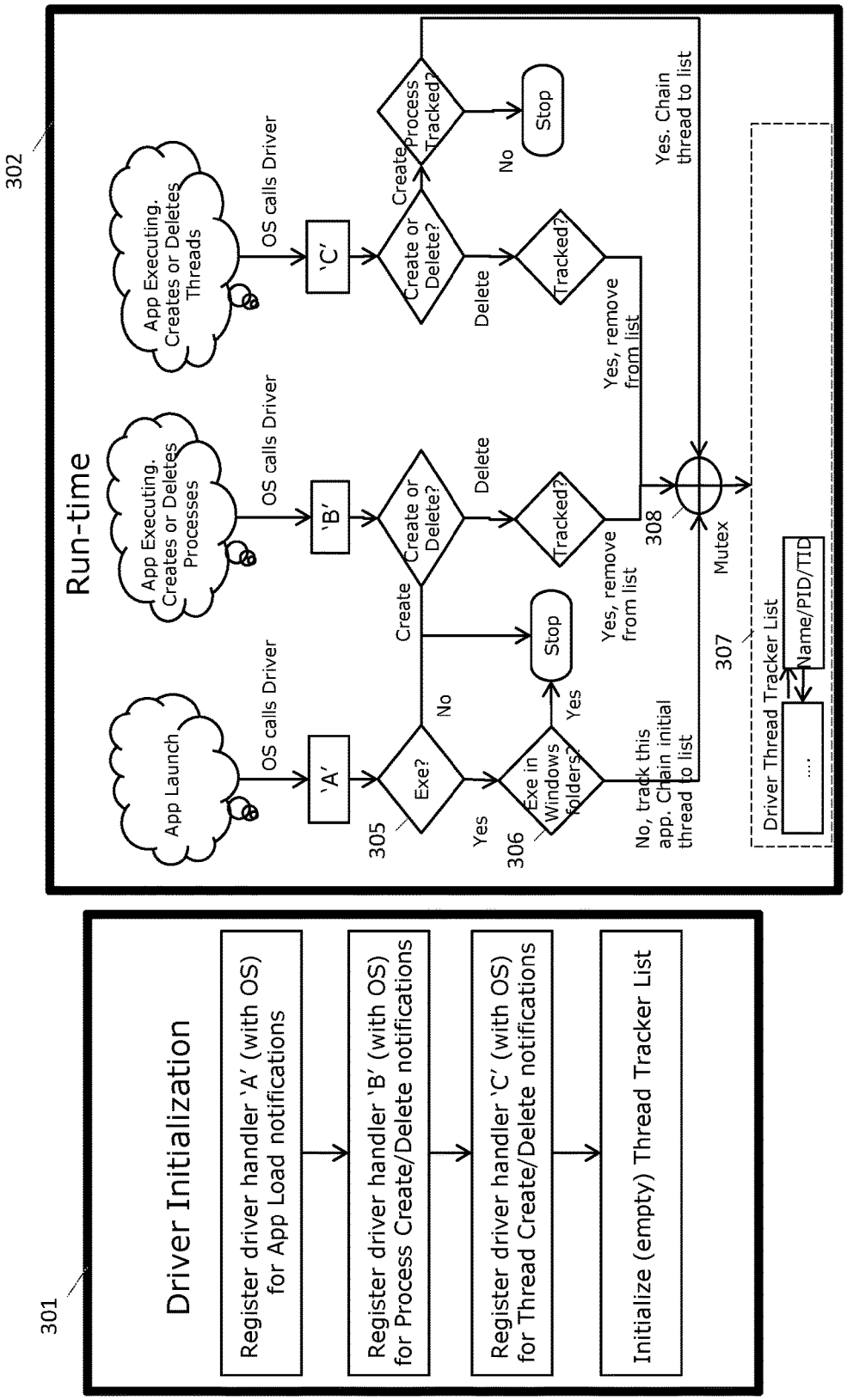
FIG. 3A illustrates example operations that may be performed by the application thread tracker of FIG. 2, according to various embodiments.

The driver 299, in embodiments, may include three function blocks, namely an application thread tracker 211, a monitoring loop 214, and an affinitization control loop 217. The application thread tracker 211 may be configured to track all the running threads on the system for different applications. A given application can have more than one thread. As an application is running, it may create new threads and/or destroy previously created threads. The application thread tracker 211 maintains a list of all the running threads. From the maintained list, the driver 299 may periodically or continuously calculate a processor core demand level of all tracked threads. FIG. 3A illustrates operations that may be performed by the application thread tracker 211, to be described more fully below.

Figure 3B:
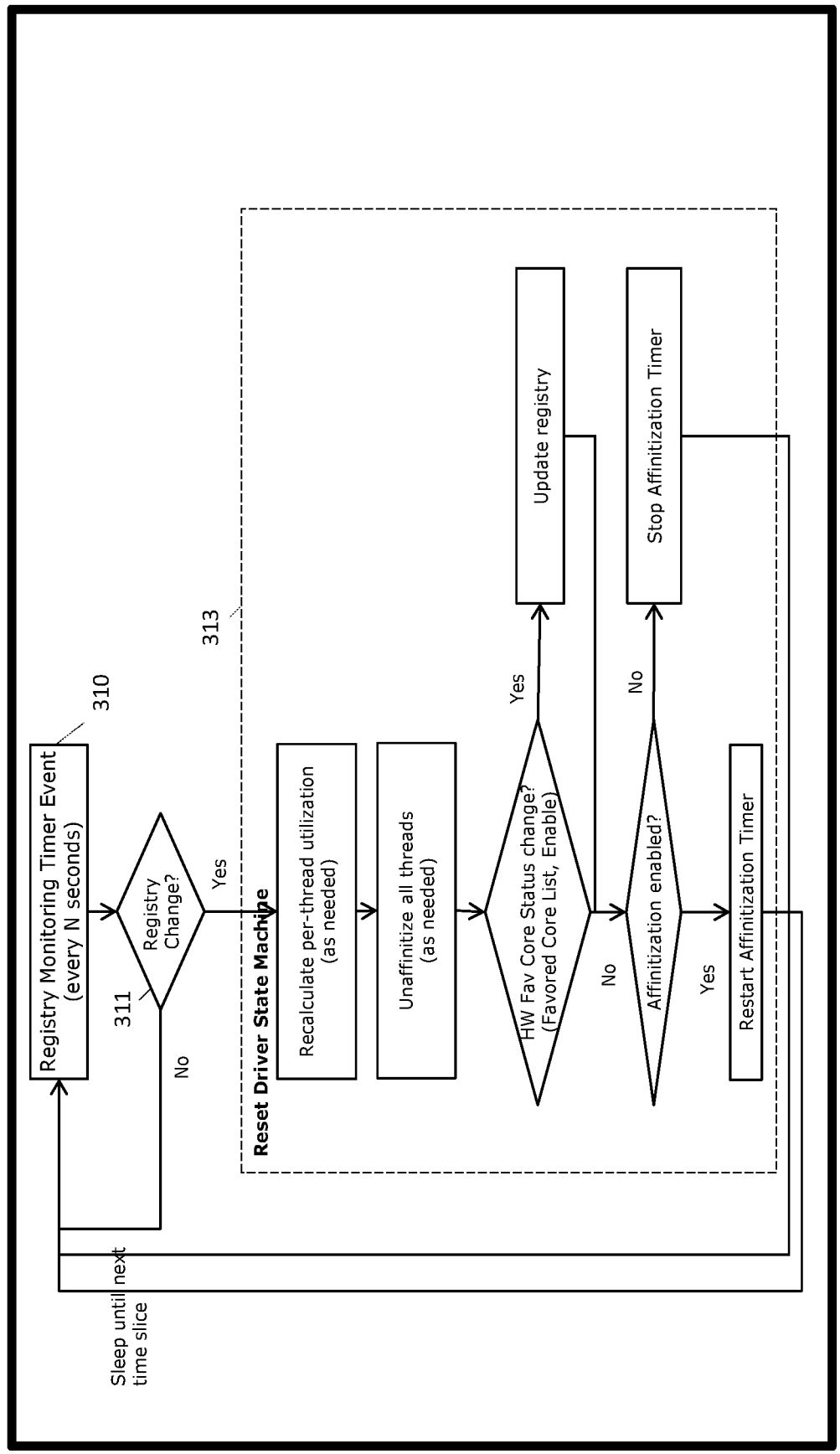
FIG. 3B illustrates example operations that may be performed by the monitoring loop of FIG. 2.

Referring again to FIG. 2, in an example the periodic demand calculations may be performed by the monitoring loop 213 according to a configurable interval. At the interval, an application thread demand checker 216 of the monitoring loop 213 may calculate utilization of each processor core, e.g., a percentage from 0-100 based on core utilization by the assigned thread or threads. If demand is greater than a programmable threshold, e.g., 90 percent, then the thread/threads may benefit from a favored core. The driver 299 may identify a subset of the currently tracked threads as "demanding" threads according to the comparison to the programmable threshold. The monitoring loop 213 may include a registry monitor 214 to communicate with the registry 206 of the operating system 205, an application thread demand checker 216, and a hardware configuration monitor 215 to communicate with a messaging interface 223, e.g., overclocking mailbox, of CPU 222. FIG. 3B illustrates operations that may be performed by the monitoring loop 213, to be described more fully below.

Figure 3C:
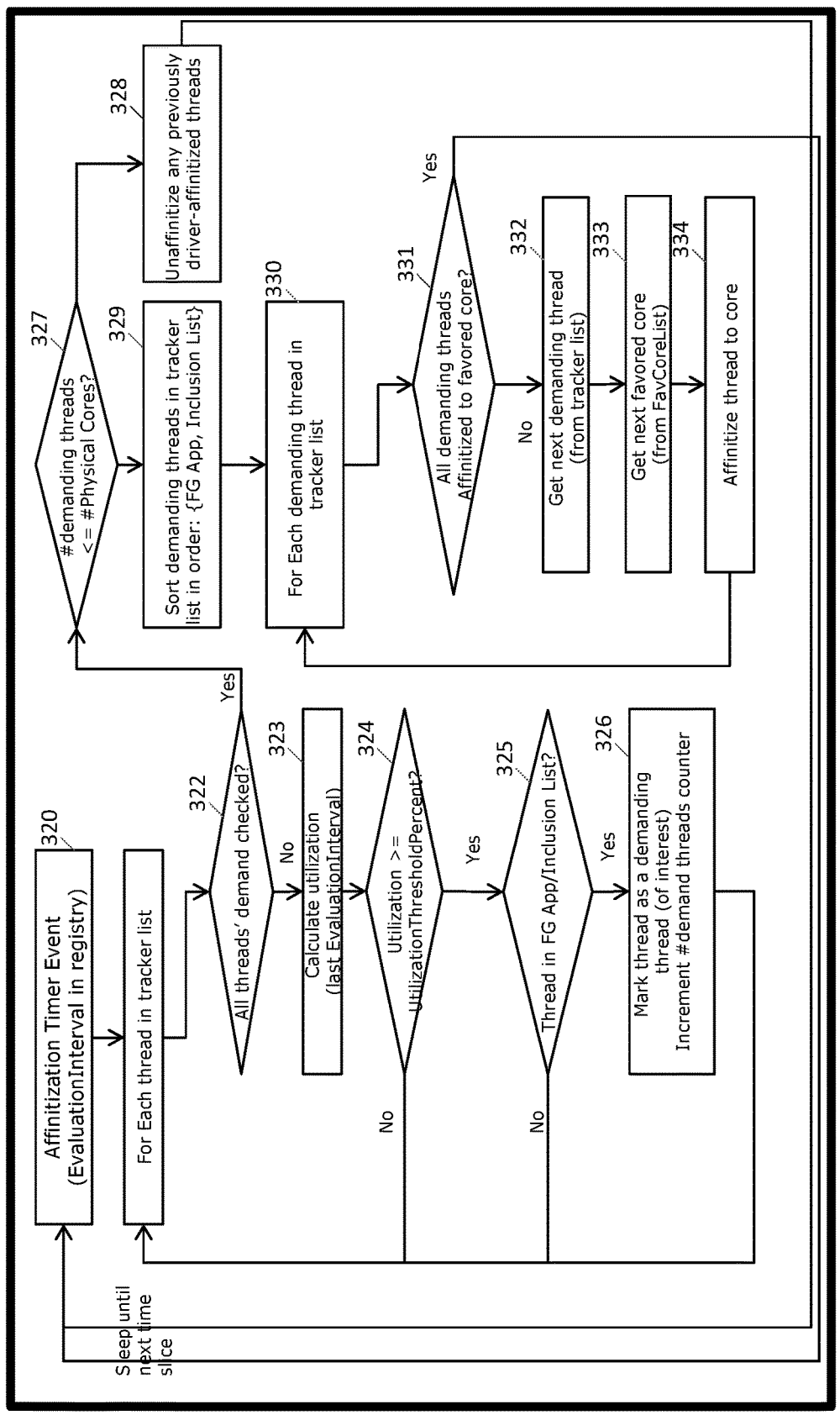
FIG. 3C illustrates example operations that may be performed by the affinitization control loop of FIG. 2, according to various embodiments.

Referring again to FIG. 2, the affinitization control loop 217 may be configured to affinitize, using an interface exposed by the operating system (e.g., an affinity interface, an ACPI interface, or the like, or combinations thereof), a thread to a selected core, e.g., a core of a favored core list. FIG. 3C illustrates operations that may be performed by the affinitization control loop 217, to be described more fully below.

Referring again to FIG. 2, the application 201 may be configured with a user interface to allow a user to select an application to be run on favored cores (threads of the user selected application may be affinitized to a favored core). The application 201, which in an example may be the Intel® Turbo Boost Max App., may include a foreground application detection loop 202 to check for new user selections and/or to determine which application is in focus in the operating system. In other embodiments, the foreground application detection loop 202 may exist within the driver 299 depending on operating system requirements.

The processor 222 may include a messaging interface 223, e.g., a mailbox interface. The messaging interface may support commands to read the favored core list, which may be a ranked list that specifies a code ID (or an index) for a given core. The favored core list can be read at times to determine where in a favored core list each core belongs. Core index zero may be a most favored core, and core index N corresponding to N cores may correspond to be a least favored core. The driver 299 may use this command of the messaging interface 223 to read the core list. In other embodiments, the driver 299 may read the Model Specific Register (MSR) (e.g., a software visible register) of each core directly, to determine whether a core is a favored one.

In some embodiments, fuses 221 may be provided. The fuses 221 may include read only memory that is programmed at manufacturing time to indicate individually for each core an attribute of the core, e.g., its operating frequency, its voltage level. The fuses 221 store this core information, which may be read by the driver 299 to determine whether a core is a favored core (which higher performance operating frequency/voltage than the frequency/voltage vand of the processor to which the core is a member).

The messaging interface 223 may be in communication with the BIOS 207. The BIOS 207 may include a user interface to enable a system administrator to manage performance configuration, e.g., overclocking, underclocking, overvolting, undervolting, or the like, or combinations thereof.

FIG. 3A illustrates example operations that may be performed by the application thread tracker of FIG. 2, according to various embodiments.

The driver, e.g., application thread tracker 211, may register with the operating system to obtain the notifications such as those shown in "driver initialization" functional block 301, e.g., application load notifications, process create/delete notifications, thread create/delete notifications. The driver, e.g., application thread tracker 211, may initialize an empty thread tracker list.

Function block 302 illustrates processes that may be performed by the driver, e.g., application thread tracker 211, at application run-time. For instance, when the application is launched, the operating system may notify the driver, e.g., application thread tracker 211.

The driver, e.g., application thread tracker 211, may perform filtering responsive to receiving notifications as shown in diamonds 305 and 306 to determine whether to track an application, or not. The driver, e.g., application thread tracker 211, may determine whether the application is an executable in diamond 305. In diamond 306, if the launched application is not an executable in an operating system folder, e.g., a Windows® folder, then the application may be a user mode application, and as such, the application is to be tracked.

In block 307, the thread tracker list may be updated. The thread tracker may store every application of interest from application launch (remaining after the filtering) by the application name and its internal identifiers that are used by the OS scheduler (process ID or "PID" and thread ID or "TID", which uniquely identify every executable piece of code of that application).

The illustrated "mutex" function 308 is refers to a mutually exclusive object, to prevent data structure corruption (so that only one piece of code can access the tracking list at any given point in time).

Notifications corresponding to an application executing (after launch) are also shown in FIG. 3A, and these events can also result in threads being added to the thread tracker list in block 307.

FIG. 3B illustrates example operations that may be performed by the monitoring loop of FIG. 2.

In block 310, the driver, e.g., monitoring loop 213, may check, according to a configurable interval (say an interval of N seconds), whether the user has changed preferences related to the favored core process. For instance, the application with the user interface enables the user to select which applications may use favored cores, and these settings may be changed by the user at any time. For instance, a ranking of the favored cores could change based on performance customization by a user, e.g., overclocking, underclocking, overvolting, undervolting, or the like, or combinations thereof. In some embodiments, the check in block 310 monitors for any parameter changed via the application with the user interface, e.g. any favored core parameter.

If a parameter change is detected, in diamond 311 the driver, e.g., monitoring loop 213, may check whether the registry has been changed. If a change is detected, a reset of a driver state machine may be performed, as shown in block 313. In some embodiments, the reset may include thread utilization recalculations (e.g., recalculating per-thread utilization as needed), unaffinitizition (e.g., unaffinitizing all threads as needed), checking for hardware favor core status change (e.g., favored core list, enable changed or not), checking for affinitization enabled change or not (e.g., check affinitization enable changed or not), registry updates, affinitization timer restarts and/or stops, or the like, or combinations thereof.

FIG. 3C illustrates example operations that may be performed by the affinitization control loop of FIG. 2, according to various embodiments.

In block 320, an affinitization timer event may occur (which may be based on a configurable interval such as an evaluation interval parameter in the registry). In diamond 322, the driver, e.g., monitoring loop 213, may determine whether all threads (in the tracker list) have had demand checked. If not, for a remaining thread in the tracker list, the driver, e.g., monitoring loop 213, in block 323, may calculate utilization (e.g., processor and/or core utilization), and in diamond 324, may determine whether the utilization is greater than a threshold, e.g., determines whether the utilization is greater than or equal to the parameter "utilizationthresholdpercent", which may be 90% in an embodiment. If the thread is in a ForeGround application or inclusion list for the favored core in diamond 325, then in block 326 the thread may be marked as a demanding thread (of interest), and the number of the demanding threads counter may be increased.

In diamond 327, the driver, e.g., monitoring loop 213, may determine whether a counter of the number of demanding threads counter is not greater than a count of physical cores. If the count is greater, then in block 328 the driver, e.g., monitoring loop 213, may unaffinitize any previously driver-affinitized threads.

In block 329, the driver, e.g., monitoring loop 213, may sort demanding threads in the tracker list, e.g., rank the threads. The ranking may be based on whether the thread is a user-selected application (from a list of the application with the user interface) and/or in focus (for instance a user-selected application that is also in focus may be ranked higher than a user-selected application that is not in focus).

In diamond 331, the driver, e.g., monitoring loop 213, may determine whether all demanding threads are affinitized to a favored core. If not, in block 332 the driver, e.g., monitoring loop 213, may get a next demanding thread from the tracker list, and in block 333 get a next favored cover from a favored core list. In block 334 the driver, e.g., monitoring loop 213, may affinitize the thread to the core.

FIGS. 4A-B illustrate an example of pseudo code to implement a module of the Power Control Unit (PCU) of the system of FIG. 1, according to various embodiments.

Software that the PCU executes may be referred to as p-code. Blocks 401-410 illustrate portions of the example pseudo code of a module of the p-code to determine work placement on processor cores.

Block 401 illustrates example definitions. Now may be the current time stamp, and entry delay, exit delay, and loop delay—may be parameters that can be set. Entry delay may be the time to wait after the operating system assigns work through a core to do any migration. Exit delay may be the time to wait after migration before doing another migration. These may prevent thrashing. Loop delay may be the time to wait between polls for a new schedule.

Block 402 may be a check to determine whether the loop delay is met. In an example, p-codes slowest poll is about one millisecond. This loop may execute every one millisecond by default, but the loop delay timer may be used to specify longer than that, if desired. If there has been no change in the number of cores that are running, or no change in the cores that are running that are currently active, then the process may wait until the next round of the loop.

Block 403 shows assignments of information to be used in the process. The value "R" may be the number of running cores that have something scheduled on them right now. Fast stack may be a stack of fastest R cores with the fastest of the cores on the top of the stack, e.g., the core with the highest frequency based on the variation at the top of the stack.

Block 404 may be a condition based on whether the operating system ability is enabled to request specific levels of performance—or power, for a particular piece of work. For example, whether a first predetermined mode is available (in the first predetermined mode the operating system is able to request from the hardware a specific level of performance of each core for a piece of work). This ability may be referred to herein as "HWP", or Intel® Speed Shift Technology. In an example the conditional check may be whether the predetermined mode, e.g., HWP, is present. If this ability is present, e.g., if hardware P is present, a slow stack of the cores that are actually running may be created with the cores sorted with those with the highest requested performance for their work at the top of the stack and the lowest requested performance for their work at the bottom of the stack. If the predetermined mode is present, the condition is whether the members of the fast stack are the same as the numbers of the slow stack, and in the same order Block 405 may be another condition based on whether or not the predetermined mode is present. Without this ability, e.g., for a second different mode, slow stack is defined as the stack of actually running cores with the slowest at the top of the stack. If the predetermined mode is not present, the condition may be whether the members of the fast stack are the same as the numbers of the slow stack regardless of order on the stack.

Block 406 may pop cores from the fast stack. If the popped core is sitting idle and the time-outs have been met, then work may be migrated from the slow stack to a faster core. The migrated work may be the work that is running on the slowest available core. If the popped core of the fast stack is already running and the predetermined mode is not available, then the process may repeat another iteration for the next topmost core of the fast stack. If the predetermined mode is available, the process may take into account a ranking. Similarly, if timeouts are not met, e.g., the core's last migration time, plus the exit delay is greater than the now), the process may move to a next core in the fast stack.

In block 407, while the selected core is not running, and while the slow stack is not empty, a core may be popped off the slow stack. This core may be referred to as the victim core because it is the slowest core still being considered (i.e., the work on that core is a victim of being on a slow core). If the predetermined mode is available, the process may determine whether or not migration would realize more performance than that workload is requesting. If the candidate core's performance level is greater than the requested performance level of the core that was popped off the slow stack, then migration may be bypassed. In other words, if the target core for migration corresponds to more performance than the operating system is requesting for the given work, then the migration may not be performed. Similarly, if the migration would be onto a core that is already running other work, and the swap of that work to the target core would result in less performance than the operating system is requesting for that work, the migration may not be performed. Similarly, in block 408 migration may not be performed if the core productivity is below a threshold that implies that migration is worthwhile.

In block 409, a migration may be performed, e.g., work may be migrated from the core that was popped off the slow stack to the target. Migration is bypassed if it would result in assigning the victim work to a lower performing core. If the predetermined mode is available and the target core is currently running work, the migration is actually a swap of work between two cores instead of merely migrating work to an idle core.

Figure 5:
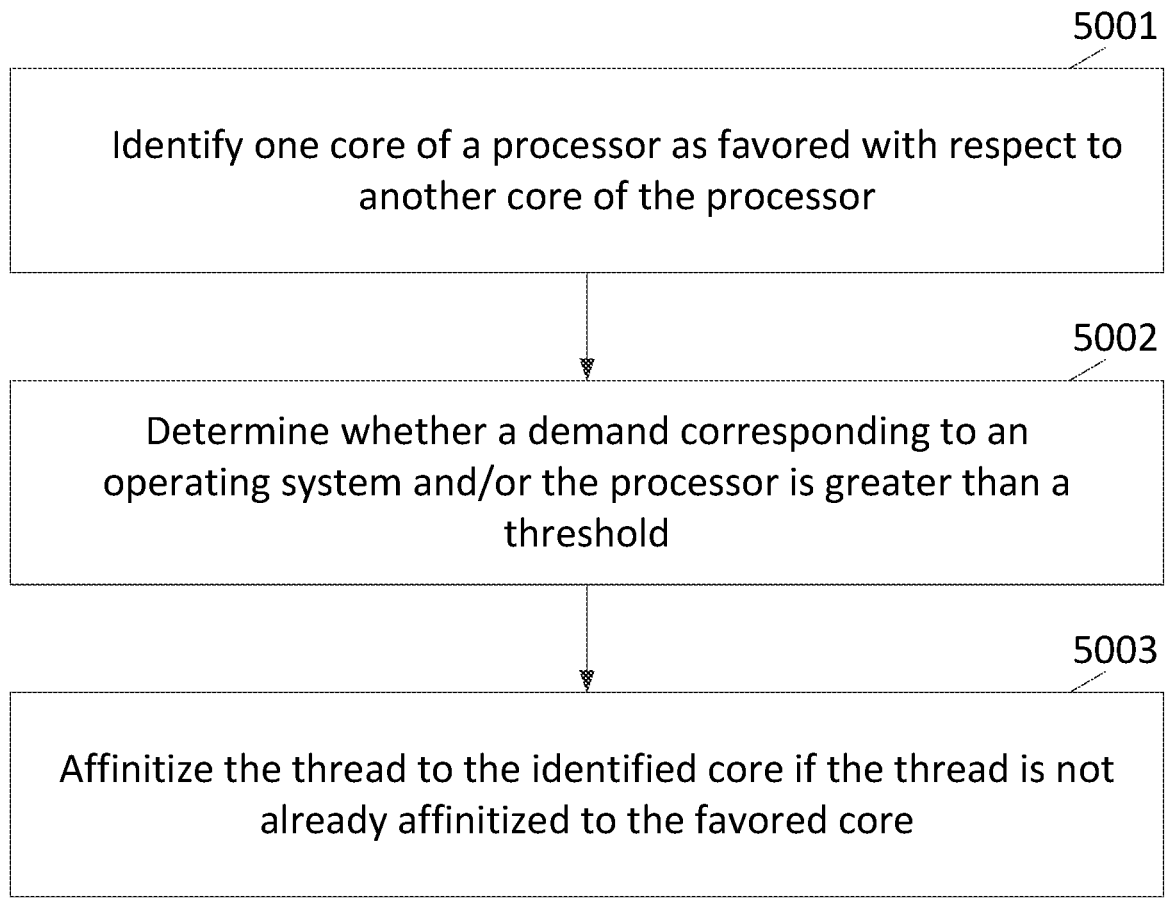
FIG. 5 illustrates an example process that may be performed by the module of FIG. 1, according to various embodiments.

FIG. 5 illustrates an example process that may be performed by the module of FIG. 1, according to various embodiments.

In block 5001, the module (which may be a driver in an embodiment) may identify one core of a processor as favored with respect to another core of the processor. In an example, the cores may be architecturally identical, but have different physical characteristics related to manufacturing of the processor. The favored core may be capable of greater instructions per second than the other core, may have better instruction per watt performance, may have a lower voltage, may be more undervoltable (capable of lower power usage while running), or the like, or combinations thereof.

In block 5002, the module may determine whether a demand of a thread corresponding to an operating system and/or the processor is greater than a threshold. In block 5003, the module may affinitize the thread to the identified core if the thread is not already affinitized to the favored core. In an example, affinitization is using an affinity interface of the operating system.

In an example, the module may determine whether a first number of threads having demand greater than the threshold is greater than a second number of running cores of the processor. The module may unaffinitize a thread-core affinitization in response to a determination that the first number is greater than the second number, e.g., may unaffinitize all thread-core affinitizations, such as all thread-core affinitizations corresponding to at least the identified core.

In an example, the module may add the thread to a tracker list in response to a determination that the demand of the thread is greater than the threshold. The module may sort the threads of the tracker list based on at least one of an inclusion list or user request received by a user interface.

In an example, the module may perform a first affinitization of an initial thread of the sorted tracker list to a core of an initial entry in a favored core list. The module may perform a second affinitization of a next thread of the sorted tracker list to a core of a next entry in the favored core list. The module may repeat the second affinitization until all threads of the sorted tracker list are affinitized to a respective one of the cores of the favored core list.

Figure 6:
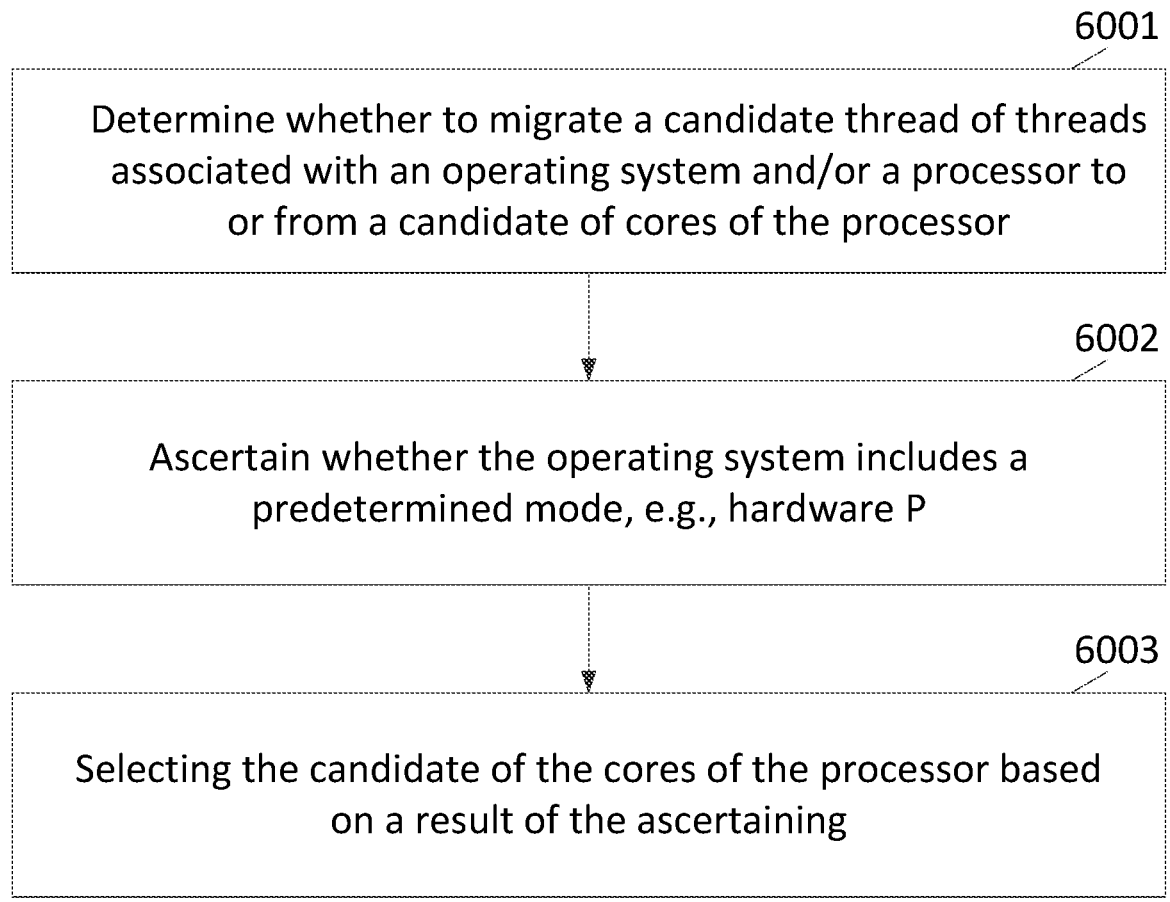
FIG. 6 illustrates another process that may be performed by the module of FIG. 1, according to various embodiments.

FIG. 6 illustrates another process that may be performed by the module of FIG. 1, according to various embodiments.

In block 6001, the module (which may be of a power control unit of a processor) may determine whether to migrate a candidate thread of threads associated with an operating system and/or the processor to or from a candidate of cores of the processor. In an example, the cores may be architecturally identical, but have different physical characteristics related to manufacturing of the processor. The favored core may be capable of greater instructions per second than the other core, may have better instruction per watt performance, may have a lower voltage, may be more undervoltable (capable of lower power usage while running), or the like, or combinations thereof.

In block 6002, the module may ascertain whether the operating system includes a predetermined mode. In an example, the predetermined mode may be HWP (hardware-P). In an example, the predetermined mode may be a mode enabling the operating system to request a specific level of performance or power for a particular piece of work.

In block 6003, the module may select the candidate of the cores of the processor based on a result of the ascertaining.

In an example, the module may generate a first ranking of a first group of the cores based on differing physical characteristics of the cores if the operating system includes the predetermined mode, or a second different ranking of a second group of the cores based on the differing physical characteristics of the cores if the operating system does not include the predetermined mode. The module may select the candidate core of the cores from a top of a stack associated with the first or second ranking.

In an example, the module may select a first subset of the cores, wherein each core of the first subset has a corresponding physical characteristic that is different, e.g., greater, than a threshold physical characteristic. A second subset of the cores may include the remaining cores. The module may identify the first or second group at a first time responsive to identifying ones of the cores of the first subset that are running and associated with work scheduled as of the first time.

In an example, the module may identify a third group at a second time responsive to identifying ones of the cores of the second subset that are running as of the first time. The module may identify the candidate thread and the candidate core during an iteration of an iterative migration checking process that corresponds to the first and second times only if the operating system does not include the predetermined mode and members of the second group are the same as members of the third group, or may identify the candidate thread and the candidate core during an iteration of an iterative migration checking process that corresponds to the first and second times only if the operating system does include the predetermined mode and members of the first ranking are the same and in the same order as members of a ranking of the third group.

Figure 7:
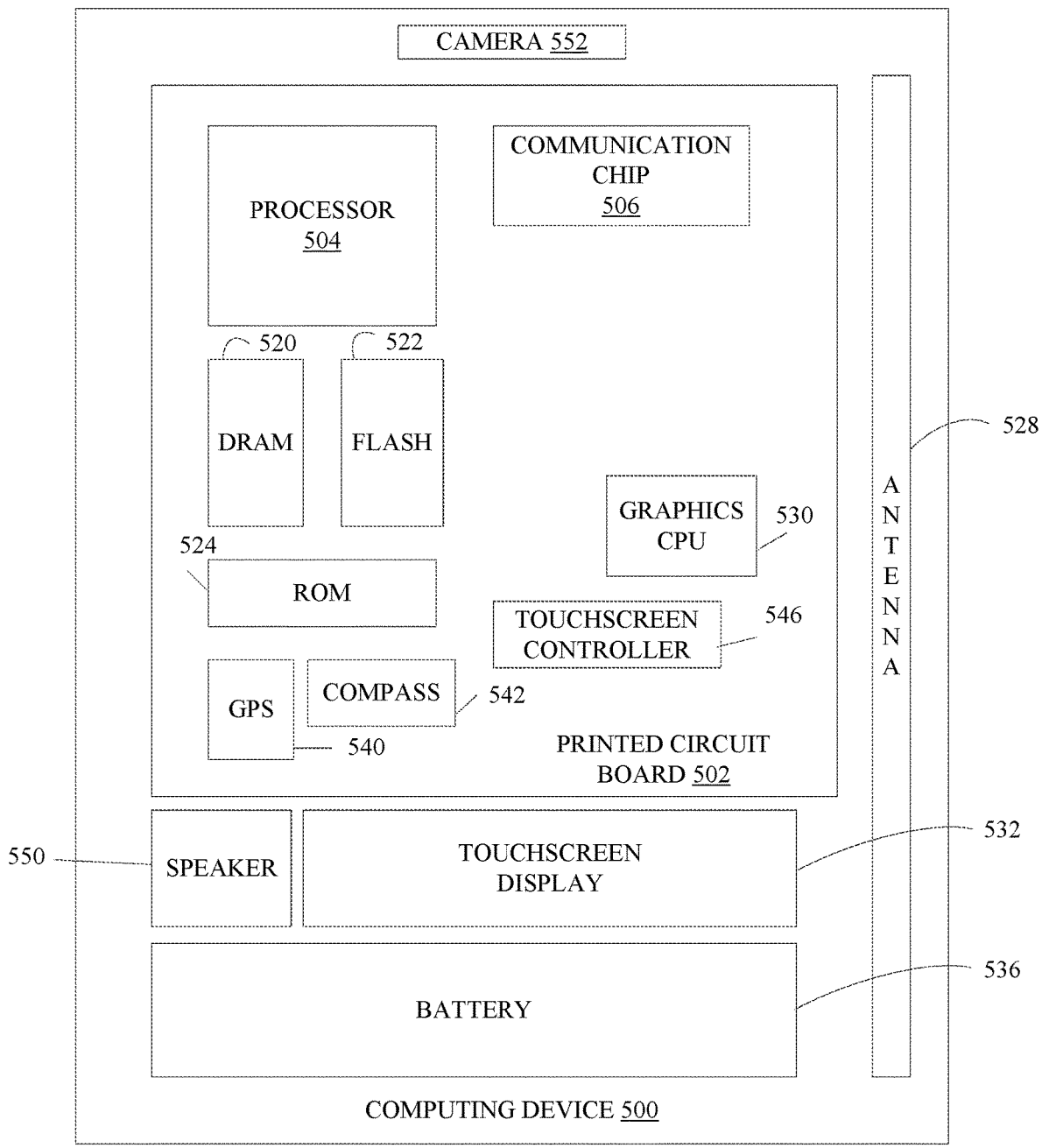
FIG. 7 illustrates an example computing device that may employ the apparatuses and/or methods described herein, according to various embodiments.

FIG. 7 illustrates an example computing device that may employ the apparatuses and/or methods described herein, according to various embodiments.

Example computing device 500 may employ the apparatuses and/or methods described herein, in accordance with various embodiments. As shown, computing device 500 may include a number of components, such as one or more processor(s) 504 (one shown) and at least one communication chip 506.

In various embodiments, the one or more processor(s) 504 each may include one or more processor cores. In various embodiments, the at least one communication chip 506 may be physically and electrically coupled to the one or more processor(s) 504. In further implementations, the communication chip 506 may be part of the one or more processor(s) 504. In various embodiments, computing device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computing device 500 may include other components that may or may not be physically and electrically coupled to the PCB 502. These other components include, but are not limited to, a memory controller (not shown), volatile memory (e.g., dynamic random access memory (DRAM) 520), non-volatile memory such as read only memory (ROM) 524, flash memory 522, an I/O controller (not shown), a digital signal processor (not shown), a crypto processor (not shown), a graphics processor 530, one or more antenna 528, a display (not shown), a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or a storage device (not shown) may include associated firmware (not shown) storing programming instructions configured to enable computing device 500, in response to execution of the programming instructions by one or more processor(s) 504, to practice all or selected aspects of the methods described herein. For example, the programming instructions may implement the earlier described driver with references to the respective ones of FIGS. 1-6. In various embodiments, these aspects may additionally or alternatively be implemented using hardware separate from the one or more processor(s) 504, flash memory 512, or storage device 511. For example, the alternate hardware may include the earlier described power control unit equipped with code to perform the operations earlier described with references to the respective ones of FIGS. 1-6.

The communication chips 506 may enable wired and/or wireless communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 5G, 5G, and beyond. The computing device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computing device 500 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder. In further implementations, the computing device 500 may be any other electronic device that processes data.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

EXAMPLES

Example 1 is an apparatus for computing including determination of processor core work placement is provided. The apparatus may include a processor including: a plurality of architecturally identical cores, wherein a first core of the plurality of architecturally identical cores has a first physical characteristic and a second core of the plurality of architecturally identical cores has a second physical characteristic that is different than the first physical characteristic; and a favored core module to be operated by the processor. The first favored core module may be to: identify one of the first and second cores as favored with respect to the other of the first and second cores; determine whether a demand of a thread is greater than a threshold; and in response to a determination that the demand of the thread is greater than the threshold, affinitize the thread to the identified core if the thread is not already affinitized to the favored core.

Example 2 includes the subject matter of example 1, and the one of the first and second physical characteristics that corresponds to the favored core includes a first voltage that is lower than a second voltage of the other of the first and second physical characteristics.

Example 3 includes the subject matter of any of examples 1-2, and the first and second cores are associated with a same operating frequency.

Example 4 includes the subject matter of any of examples 1-2, and the first and second cores are associated with different operating frequencies.

Example 5 includes the subject matter of any of examples 1-4, and the favored core corresponds to a user-selection input via a user interface.

Example 6 includes the subject matter of any of examples 1-5, and the favored core corresponds to data of a fuse table.

Example 7 includes the subject matter of any of examples 1-6, and the favored core module is to: determine whether a first number of threads having demand greater than the threshold is greater than a second number of running cores of the processor; and in response to a determination that the first number is greater than the second number, unaffinitize a thread-core affinitization.

Example 8 includes the subject matter of any of examples 1-7, and the favored core module is to: in response to the determination that the first number is greater than the second number, unaffinitize all thread-core affinitizations corresponding to at least the identified core.

Example 9 includes the subject matter of any of examples 1-8, and the favored core module is to: in response to a determination that the demand of the thread is greater than the threshold, add the thread to a tracker list; sort the threads of the tracker list based on at least one of an inclusion list or user request received by a user interface.

Example 10 includes the subject matter of any of examples 1-9, and the favored core module is to: perform a first affinitization of an initial thread of the sorted tracker list to a core of an initial entry in a favored core list; perform a second affinitization of a next thread of the sorted tracker list to a core of a next entry in the favored core list; and repeat the second affinitization until all threads of the sorted tracker list are affinitized to a respective one of the cores of the favored core list.

Example 11 is a computer-readable medium for computing including determination of processor core work placement, the instructions having instructions stored thereon that, in response to execution by a processing device, cause the processing device to perform operations, to: identify one of a plurality of cores of a processor as favored with respect to another of the plurality of cores; determine whether a demand of a thread corresponding to the processor is greater than a threshold; and in response to a determination that the demand of the thread is greater than the threshold, affinitize the thread to the identified core if the thread is not already affinitized to the favored core.

Example 12 includes the subject matter of example 11, and the operations are further to: determine whether a first number of threads having demand greater than the threshold is greater than a second number of running cores of the processor; and in response to a determination that the first number is greater than the second number, unaffinitize a thread-core affinitization.

Example 13 includes the subject matter of any of examples 11-12, and the operations are further operable to: in response to the determination that the first number is greater than the second number, unaffinitize all thread-core affinitizations corresponding to at least the identified core.

Example 14 includes the subject matter of any of examples 11-13, and operations are further operable to: in response to a determination that the demand of the thread is greater than the threshold, add the thread to a tracker list; and sort the threads of the tracker list based on at least one of an inclusion list or user request received by a user interface.

Example 15 includes the subject matter of any of examples 11-14, and the operations are further operable to: perform a first affinitization of an initial thread of the sorted tracker list to a core of an initial entry in a favored core list; perform a second affinitization of a next thread of the sorted tracker list to a core of a next entry in the favored core list; and repeat the second affinitization until all threads of the sorted tracker list are affinitized to a respective one of the cores of the favored core list.

Example 16 is an apparatus for computing including determination of determine processor core work placement of threads associated with an operating system, the apparatus comprising: a plurality of cores, wherein a first core of the plurality of cores has a first physical characteristic and a second core of the plurality of cores has a second physical characteristic that is different than the first physical characteristic; and a power control unit to: determine whether to migrate a candidate thread of the threads to or from a candidate of the plurality of cores; ascertain whether the operating system includes a predetermined mode; and select the candidate of the plurality of cores based on a result of the ascertainment.

Example 17 includes the subject matter of example 16, and the power control unit is further to: generate a first ranking of a first group of the plurality of cores based on differing physical characteristics of the plurality of cores if the operating system includes the predetermined mode; generate a second ranking of a second group of the plurality of cores based on the differing physical characteristics of the plurality of cores if the operating system does not include the predetermined mode, wherein the second ranking is different than the first ranking; and select the candidate core of the plurality of cores from a top of the first or second ranking.

Example 18 includes the subject matter of any of examples 16-17, and the power control unit is further to: select a first subset of the plurality of cores, wherein each core of the first subset has a corresponding physical characteristic greater than a threshold physical characteristic; and wherein a second subset of the plurality of cores includes the remaining cores; form the first or second group at a first time responsive to identifying ones of the cores of the first subset that are running and associated with work scheduled as of the first time.

Example 19 includes the subject matter of any of examples 16-18, and the power control unit is further to: form a third group at a second time responsive to identifying ones of the cores of the second subset that are running as of the first time.

Example 20 includes the subject matter of any of examples 16-19, and the power control unit is further to: identify the candidate thread and the candidate core during an iteration of an iterative migration checking process that corresponds to the first and second times only if the operating system does not include the predetermined mode and members of the second group are the same as members of the third group; and identify the candidate thread and the candidate core during an iteration of an iterative migration checking process that corresponds to the first and second times only if the operating system does include the predetermined mode and members of the first ranking are the same and in the same order as members of a ranking of the third group.

Example 21 is a method for computing including determination of processor core work placement of threads associated with an operating system with respect to a plurality of architecturally identical cores, the method comprising: determining whether to migrate a candidate thread of the threads to or from a candidate of the plurality of architecturally identical cores; ascertaining whether the operating system includes a predetermined mode; and selecting the candidate of the plurality of architecturally identical cores based on a result of the ascertaining.

Example 22 includes the subject matter of example 21, and generating a first ranking of a first group of the plurality of architecturally identical cores based on differing physical characteristics of the plurality of architecturally identical cores if the operating system includes the predetermined mode; generating a second ranking of a second group of the plurality of architecturally identical cores based on the differing physical characteristics of the plurality of architecturally identical cores if the operating system does not include the predetermined mode, wherein the second ranking is different than the first ranking; and selecting the candidate core of the plurality of architecturally identical cores from a top of the first or second ranking.

Example 23 includes the subject matter of any of examples 20-21, selecting a first subset of the plurality of architecturally identical cores, wherein each core of the first subset has a corresponding physical characteristic greater than a threshold physical characteristic; and wherein a second subset of the plurality of architecturally identical cores includes the remaining cores; forming the first or second group at a first time responsive to identifying ones of the cores of the first subset that are running and associated with work scheduled as of the first time.

Example 24 includes the subject matter of any of examples 21-23 and forming a third group at a second time responsive to identifying ones of the cores of the second subset that are running as of the first time; identifying the candidate thread and the candidate core during an iteration of an iterative migration checking process that corresponds to the first and second times only if the operating system does not include the predetermined mode and members of the second group are the same as members of the third group; and identifying the candidate thread and the candidate core during an iteration of an iterative migration checking process that corresponds to the first and second times only if the operating system does include the predetermined mode and members of the first ranking are the same and in the same order as members of a ranking of the third group.

Example 25 includes the subject matter of any of examples 21-24, wherein the predetermined mode is a mode enabling the operating system to request a specific level of performance or power for a particular piece of work.

Example 26 is an apparatus determination of processor core work placement, the apparatus comprising: means for identifying one of a plurality of cores of a processor as favored with respect to another of the plurality of cores; means for determining whether a demand of a thread corresponding to the processor is greater than a threshold; and means for affinitizing the thread to the identified core if the thread is not already affinitized to the favored core in response to a determination that the demand of the thread is greater than the threshold.

Example 27 includes the subject matter of example 26, and means for determining whether a first number of threads having demand greater than the threshold is greater than a second number of running cores of the processor; and means for unaffinitizing a thread-core affinitization in response to a determination that the first number is greater than the second number.

Example 28 includes the subject matter of any of examples 26-27, and means for unaffinitizing all thread-core affinitizations corresponding to at least the identified core in response to the determination that the first number is greater than the second number.

Example 29 includes the subject matter of any of examples 26-28, and adding the thread to a tracker list in response to a determination that the demand of the thread is greater than the threshold; and sorting the threads of the tracker list based on at least one of an inclusion list or user request received by a user interface.

Example 30 includes the subject matter of any of examples 26-29, and performing a first affinitization of an initial thread of the sorted tracker list to a core of an initial entry in a favored core list; performing a second affinitization of a next thread of the sorted tracker list to a core of a next entry in the favored core list; and repeating the second affinitization until all threads of the sorted tracker list are affinitized to a respective one of the cores of the favored core list.

What is claimed is:
1. An apparatus, comprising:
a processor including:
a plurality of cores; and
a favored core module operable by the processor to:

generate a ranking of the plurality of cores based on differing physical characteristics the plurality of cores;

identify one or more cores of the plurality of cores as favored with respect to one or more other cores of the plurality of cores based on the ranking, and include the one or more cores identified as favored in a favored core list;

for each thread of a plurality of threads:

determine whether a demand of the thread is greater than a threshold; and in response to a determination that the demand of the thread is greater than the threshold, select the thread for affinitization;

determine whether a first count of selected thread(s) is less than or equal to a second count of the core(s) of the favored core list; and in response to a determination that the first count is less than or equal to the second count, affinitize all selected thread(s) to a respective one of the core(s) of the favored core list, including:

perform a first affinitization of an initial thread of the selected thread(s) to a core of an initial entry in the favored core list; and perform one or more second affinitizations of any one or more next threads, respectively, of the selected thread(s) to one or more cores of the one or more next entries in the favored core list, respectively; and in response to a determination that the first count is greater than the second count, unaffinitize at least one thread-core affinitization.

2. The apparatus of claim 1, wherein the one or more cores identified as favored have one or more first operating voltages, respectively, that are lower than one or more second operating voltages, respectively, of the one or more other cores.

3. The apparatus of claim 2, wherein the at least one core of the one or more cores identified as favored is associated with a same operating frequency as at least one core of the one or more other cores.

4. The apparatus of claim 2, wherein the at least one core of the one or more cores identified as favored is associated with a different operating frequency than at least one core of the one or more other cores.

5. The apparatus of claim 1, wherein at least one of the one or more cores identified as favored corresponds to a user-selection input via a user interface.

6. The apparatus of claim 1, wherein at least one of the one or more cores identified as favored corresponds to data of a fuse table.

7. The apparatus of claim 1, wherein unaffinitize at least one thread-core affinitization comprises unaffinitize all thread-core affinitizations corresponding to at least one core of the core(s) of the favored core list.

8. The apparatus of claim 7, wherein the favored core module is further to:

prior to affinitize all selected thread(s), sort the selected thread(s) based on at least one of an inclusion list or user request received by a user interface.

9. The apparatus of claim 1, wherein the favored core module is further to, for each thread of the plurality of threads, in response to a determination that the demand of the thread is greater than the threshold:

add the thread to a tracker list and sort the threads of the tracker list based on an inclusion list or a user request received via a user interface; and select the sorted thread for affinitization.

10. A non-transitory computer-readable medium having instructions stored thereon that, in response to execution by a processing device, cause the processing device to perform operations, to:

generate a ranking of cores of a processor based on differing physical characteristics of the cores;

identify one or more of the cores of the processor as favored with respect to one or more other cores of the cores of the processor based on the ranking, and include the one or more cores identified as favored in a favored core list;

for each thread of a plurality of threads:

determine whether a continuously or periodically monitored demand of the thread is greater than a threshold; and in response to a determination that the continuously or periodically monitored demand of the thread is greater than the threshold, select the thread for affinitization;

determine whether a first count of selected thread(s) is less than or equal to a second count of the core(s) of the favored core list; and in response to a determination that the first count is less than or equal to the second count, affinitize all selected thread(s) to a respective one of the core(s) of the favored core list:

perform a first affinitization of an initial thread of the selected thread(s) to a core of an initial entry in the favored core list; and perform one or more second affinitizations of any one or more next threads, respectively, of the selected thread(s) to one or more cores of the one or more next entries in the favored core list, respectively; and in response to a determination that the first count is greater than the second count, unaffinitize at least one thread-core affinitization.

11. The non-transitory computer-readable medium of claim 10, wherein unaffinitize at least one thread-core affinitization comprises unaffinitize all thread-core affinitizations corresponding to at least one core of the core(s) of the favored core list.

12. The non-transitory computer-readable medium of claim 11, wherein operations are further operable to:

prior to affinitize all selected thread(s), sort the selected thread(s) based on at least one of an inclusion list or user request received by a user interface.

13. The non-transitory computer-readable medium of claim 10, wherein the operations include, for each thread of the plurality of threads:

add the thread to a tracker list and sort the threads of the tracker list based on an inclusion list or a user request received via a user interface; and select the sorted thread for affinitization.

14. The non-transitory computer-readable medium of claim 10, wherein the one or more cores identified as favored have one or more first operating voltages, respectively, that are lower than one or more second operating voltages, respectively, of the one or more other cores.

15. The non-transitory computer-readable medium of claim 14, wherein the at least one core of the one or more cores identified as favored is associated with a same operating frequency as at least one core of the one or more other cores.

16. The non-transitory computer-readable medium of claim 14, wherein the at least one core of the one or more cores identified as favored is associated with a different operating frequency than at least one core of the one or more other cores.

17. The non-transitory computer-readable medium of claim 10, wherein at least one of the one or more cores identified as favored corresponds to a user-selection input via a user interface.

18. The non-transitory computer-readable medium of claim 10, wherein at least one of the one or more cores identified as favored corresponds to data of a fuse table.

19. The non-transitory computer-readable medium of claim 10, wherein the continuously or periodically monitored demand of the thread is based on current core utilization by the thread.

20. The apparatus of claim 1, wherein the demand of the thread is based on current core utilization by the thread.

* * * * *